(12) United States Patent
Olschafskie et al.

(10) Patent No.: US 6,616,038 B1
(45) Date of Patent: Sep. 9, 2003

(54) SELECTIVE TEXT RETRIEVAL SYSTEM

(76) Inventors: Francis Olschafskie, 46 Atherton St., Boston, MA (US) 02119; Allan Chasanoff, 117 E. 36th St., New York, NY (US) 10016

( * ) Notice: Subject to any disclaimer, the term of this patent is extended or adjusted under 35 U.S.C. 154(b) by 0 days.

(21) Appl. No.: 09/565,799

(22) Filed: May 5, 2000

Related U.S. Application Data (63) Continuation-in-part of application No. 08/738,813, filed on Oct. 28, 1996, now abandoned, and a continuation-in-part of application No. 09/527,995, filed on Mar. 17, 2000, now Pat. No. 6,460,766.

(51) Int. Cl.[7] ................................................. G06K 7/10
(52) U.S. Cl. ........................................ 235/454; 235/375
(58) Field of Search .............................. 235/435, 454, 235/494, 462.01–462.49, 375; 707/500, 501.1; 358/448, 452, 453

(56) References Cited

U.S. PATENT DOCUMENTS

| | | | | |
|---|---|---|---|---|
| 5,062,666 A | * | 11/1991 | Mowry et al. | 283/57 |
| 5,430,558 A | * | 7/1995 | Sohaei et al. | 235/462.45 |
| 5,480,306 A | * | 1/1996 | Liu | 235/462.01 |
| 5,506,697 A | * | 4/1996 | Li et al. | 358/448 |
| 5,781,914 A | * | 7/1998 | Stork et al. | 707/501.1 |
| 5,899,700 A | * | 5/1999 | Williams et al. | 382/306 |
| 5,945,656 A | * | 8/1999 | Lemelson et al. | 235/462.01 |
| 6,095,418 A | * | 8/2000 | Swartz et al. | 235/462.01 |

* cited by examiner

Primary Examiner—Michael G. Lee
Assistant Examiner—Jamara A. Franklin
(74) Attorney, Agent, or Firm—Bromberg & Sunstein LLP (57) ABSTRACT

A system and method for recording and retrieving information relevant to selected text of written materials is provided. A multiple page text having spatial symbology corresponding to the text is provided and the spatial symbology corresponding to selected text is scanned with an optical scanning device and transmitted to a processor. The processor has a memory and is in communication with the optical scanning device. The information retrieved may be a digital form of the selected text that may be further manipulated. In further embodiments, the processor is in communication with a local area network or a wide area network and information in data sources along the network may be retrieved. The processor may also be in communication with a computer monitor, a printing device, or any combination of the above. In still further embodiments, a microphone is in communication with the processor and oral annotations to the selected text are recorded through the microphone.

23 Claims, 6 Drawing Sheets

SELECTIVE TEXT RETRIEVAL SYSTEM

This application is a Continuation-in-Part of application Ser. No. 08/738,813 now abandoned, filed Oct. 28, 1996, and application Ser. No. 09/527,995 now U.S. Pat. No. 6,460,766, filed Mar. 17, 2000, both of which are hereby incorporated herein by reference.

TECHNICAL FIELD

The present invention relates to note taking systems and, in particular, to systems and methods for retrieving information for subsequent or simultaneous manipulation.

BACKGROUND ART

Non-electronic methods for taking notes from books, documents, and other printed materials are generally slow or unreliable. Students, lawyers, and other people dependent upon prior authority have limited resources by which they may select desired portions of a document and reproduce them quickly and accurately. Generally, this requires marking selected passages from printed documents with tabs or highlighters and reproducing them manually at a later time.

Recent developments in the area of optical character recognition (OCR) scanning make it possible to acquire discrete text strings and organize those strings in a preselected format for later use. Such devices, however, depend upon the scanner's ability to recognize a character based on known OCR techniques, such as geometric OCR, which detects the printed character's shape. Variations in fonts have made it difficult to achieve total accuracy with geometric OCR.

Hypertext links provide quick access to information and documents located on the World Wide Web. Such links are embedded into a Web document and a user clicks on the hypertext link with a mouse button to initiate a request by a browser for a new Web page or new location within the same document.

SUMMARY OF THE INVENTION

In a first embodiment, a system for retrieving information relevant to selected text includes a multiple page text having spatial symbology corresponding to the text and an optical scanning device for detecting the spatial symbology. The spatial symbology may be embedded in graphic symbols within the text or the spatial symbology may be outside the graphic symbols. The system further includes a processor in communication with the optical scanning device. The processor may be internal to the optical scanning device or external to it. Preferably, the processor has a memory and is in communication with a data source. The data source may contain information relevant to the multiple page text for retrieval by the processor. In further embodiments, the system includes a computer monitor in communication with the processor whereby a user may view the information retrieved by the processor. The system may also include a printer in communication with the processor, as well as a microphone for oral annotation of the retrieved information.

In another embodiment of the invention, the data source is located at a network address. In still another embodiment, the data source contains the text corresponding to the spatial symbology in digital form.

In accordance with another aspect of the present invention, a method for retrieving information relevant to selected text includes providing a multiple page text with spatial symbology. The spatial symbology corresponding to selected text is scanned with an optical scanning device and transmitted to a processor with memory that is in communication with the optical scanning device. The spatial symbology is identified in the processor and information relevant to the text is located in a data source in communication with the processor. The information from the data source is then read by the processor.

In another embodiment of the invention, the information is written to a document in a word processor in communication with the processor. A file of the information may also be created by the processor, and the information may be viewed on a computer monitor in communication with the processor. In yet other embodiments, the information is printed by a printer in communication with the processor or orally annotated via a microphone that is in communication with the processor.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
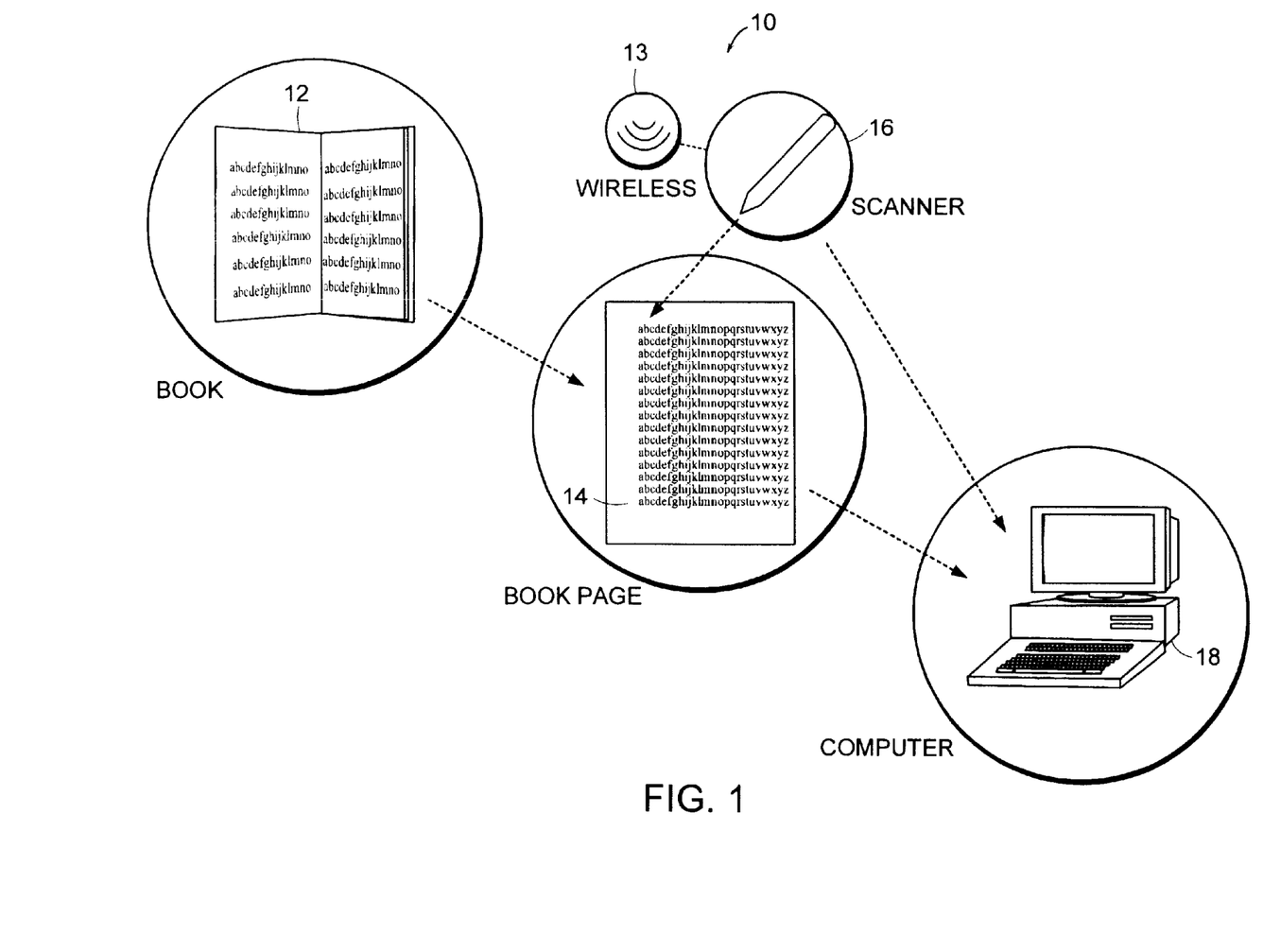
FIG. 1 is a system in accordance with one aspect of the present invention.

FIG. 1 illustrates a system 10 in accordance with one embodiment of the present invention wherein spatial symbology is embedded within the text of a printed document 12. The document (e.g., a book, a webpage, a legal brief, etc) 12 contains a plurality of graphic symbols 14. A graphic symbol may be a number, letter, picture, icon or any other mark or image contained in the data source of a processor. In a preferred embodiment, the graphic symbols may be alphanumeric characters, each of which are associated with code in the file, such as an ASCII code.

The processor 18 may store the text for further manipulation or reproduce it physically or electronically. The graphic symbols 14 may include spatial symbology embedded in them which is scanned by an optical scanning device 16. Such optical scanning devices are described in U.S. Pat. No. 5,301,243 to Olschafskie et al. and U.S. Pat. No. 5,574,804 also to Olschafskie et al. both of which are incorporated herein by reference. For purposes of the present application, "spatial symbology" is defined as an arrangement of marks, symbols or images configured to express a data message detectable and interpretable by a scanning device and microprocessor, such as but not limited to a pattern of wide and narrow spaces, dots, lines, or any layout of shapes and spaces.

The optical scanning device 16 may be in wireless 13 communication (e.g., using radio frequency or infrared radiation) with a processor 18, or the processor may be incorporated within the optical scanning device 16. The processor 18 interprets the spatial symbology and retrieves relevant information, corresponding text, or a digital version of the text from a data source external to the system 10 or from an internal digital file, such as a CD ROM or floppy disk.

Spatial symbology may be used in numerous ways to identify a variety of information. Spatial symbology may reference a digital version of portions of the text itself, passages from any document pertinent to the scanned text, or as a message relevant to the text in which if is embedded. Additionally, the spatial symbology may include information such as the title of the document, a heading under which the passage may be found, page number, and/or line number, parallel citation, Internet address, or filename and path. The information determined by the spatial symbology may also include topic information that may be useful in automatically designating an appropriate computer file for storing a passage being scanned.

The processor 18 may store the information retrieved through the spatial symbology. Further information may also be gathered and stored by the processor 18. For example, conventional OCR techniques can be used to capture the graphic symbols while the spatial symbology retrieves supplementary information. Furthermore, one set of spatial symbology can be used in accordance with the embodiments of the present invention, while another set of spatial symbology identifies the graphic symbols scanned. The information may be stored in a computer file and may be manipulated at any time by a computer given access to the file. The information can be reproduced physically or electronically as desired. This embodiment of the invention exploits the practice of publishing a given document in both paper and electronic form.

Figure 2:
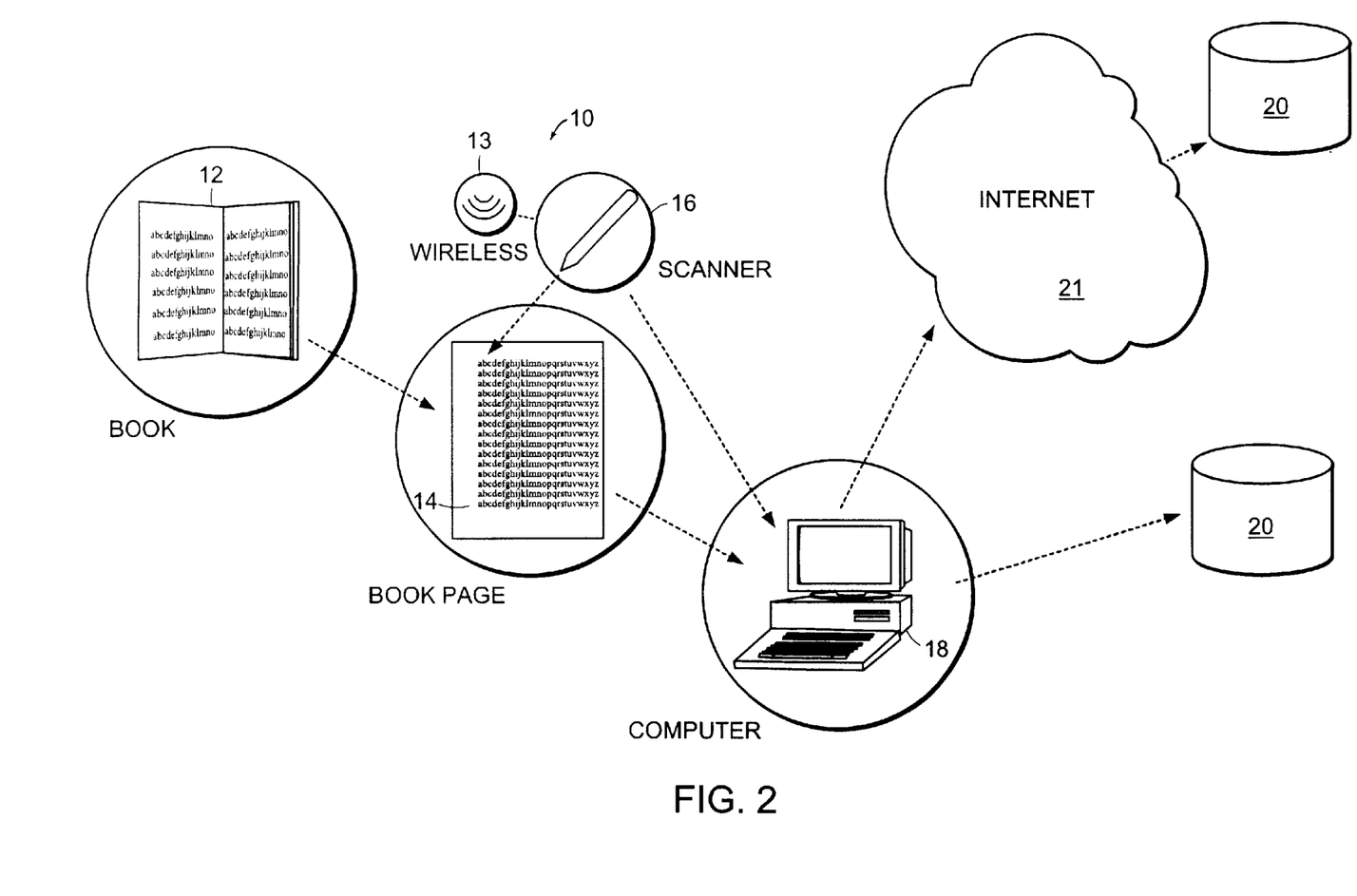
FIG. 2 is a system in accordance with another aspect of the present invention.

FIG. 2 illustrates a system in accordance with another aspect of the invention wherein the spatial symbology provides a link to a data source 11 external to the system 10 of FIG. 1. This may be accomplished through local area networking or wide area networking, such as the through the Internet 21. The data source 20 may include a digital version of the scanned text. The symbology may reference a portion of the text which can then be accurately saved. Alternatively, the data source 20 may contain information relevant to the subject matter of the scanned text. The spatial symbology may act as a link to information on the network and may provide the microprocessor with a network address or website where information related to the selected text may be found.

Figure 3A:
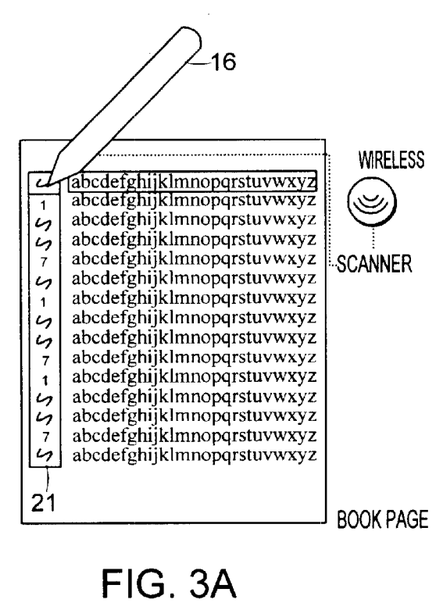
FIGS. 3(a)–(c) illustrate embodiments of pages of a multiple page text in accordance with another aspect of the present invention.
Figure 3B:
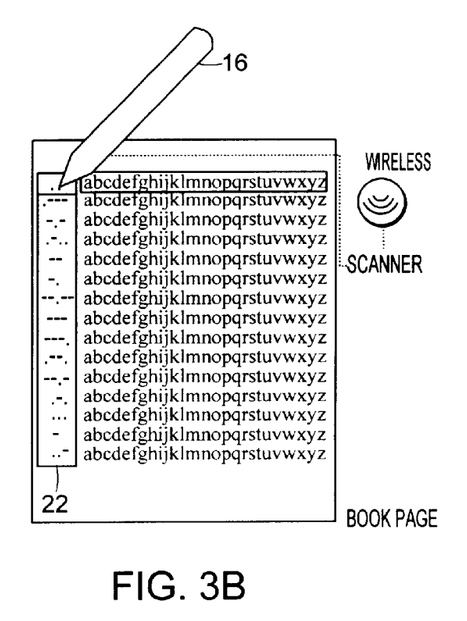
Figure 3C:
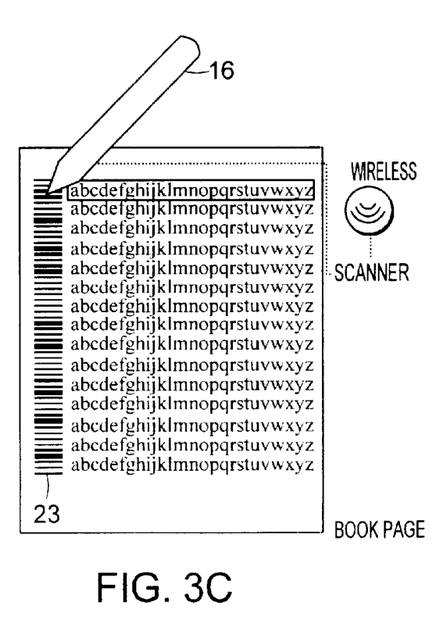

FIGS. 3(*a*)–(*c*) illustrate embodiments of pages of a multiple page text in accordance with another aspect of the present invention. In these embodiments, the spatial symbology is located parallel to the text, and a user scans the spatial symbology parallel to the text he or she is interested in noting with the scanning device. It should be noted that the spatial symbology may be located anywhere in the multiple page text, such as in a footnote or endnote. In accordance with these embodiments an optical scanning device 16 (see FIGS. 1 and 2 ) is used to read the spatial symbology corresponding to the sections of the text selected. In FIG. 3(*a*) the spatial symbology 21 is of abstract design. In FIG. 3(*b*) the spatial symbology is configured similar to morse code, and in FIG. 3(*c*) the spatial symbology is similar to bar code. As in previous embodiments, the spatial symbology may be used to identify a variety of information.

Figure 4:
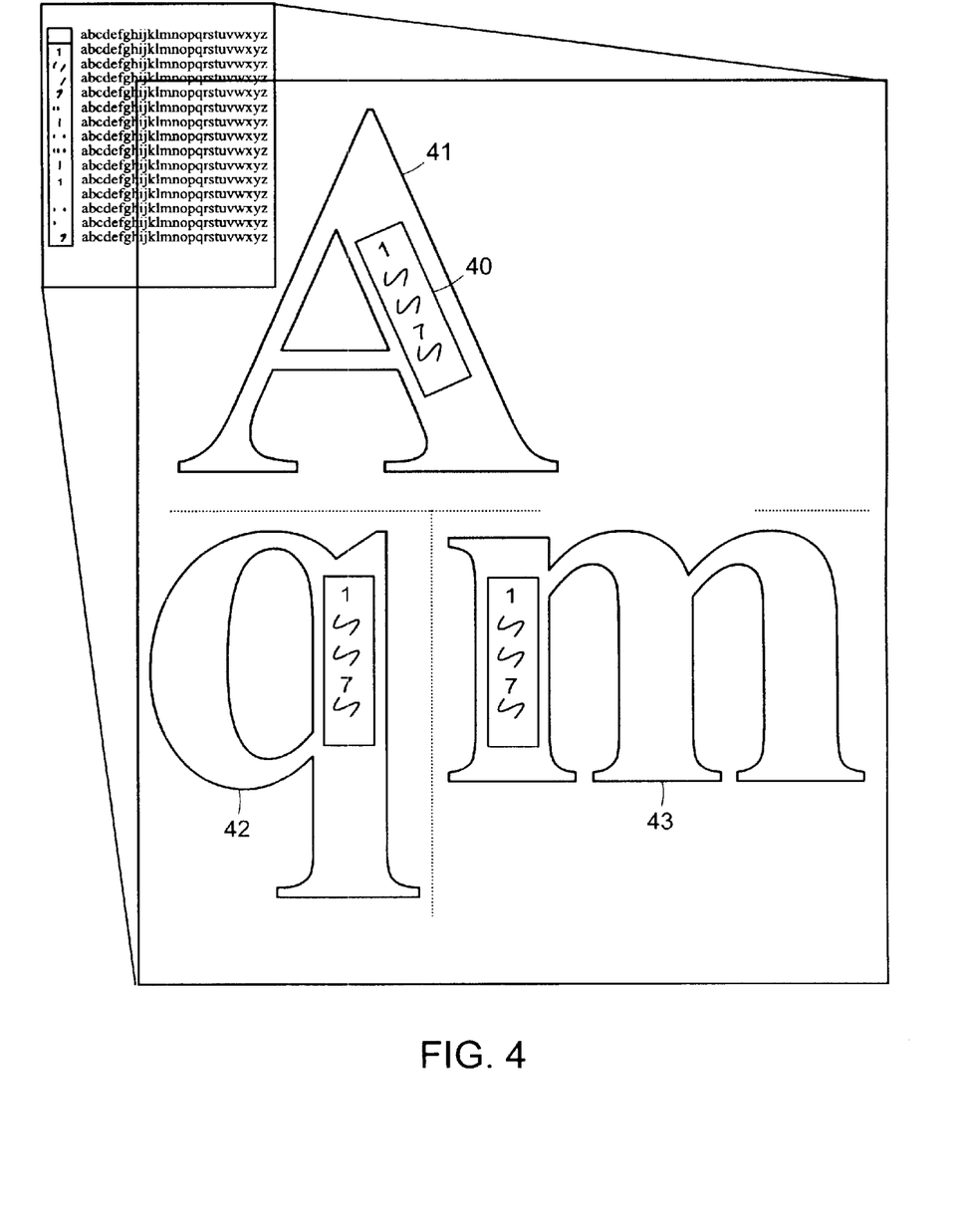
FIG. 4 illustrates spatial symbology in accordance with a further aspect of the present invention.

FIG. 4 illustrates spatial symbology in accordance with a further aspect of the present invention. In this embodiment, the spatial symbology 40 is embedded in the graphic symbols 41, 42, and 43 that make up the text. A user scans the graphic symbols corresponding to the text he or she is interested in noting with the scanning device. Printing of such graphic symbols 41,42, and 43 with the spatial symbology can be accomplished by providing a spatial symbology overlay that could be used with most or all fonts. A printing utility to accomplish the spatial symbology overlay would eliminate pixels of the underlying graphic symbol and substitute the corresponding spatial symbology. Such an overlay would work effectively with most or all fonts and the resulting printed characters would permit detection of the spatial symbology 40, as well as, if desired, recognition of the graphic symbol itself. The spatial symbology 40 embedded in the graphic symbols 41,42, and 43 may be used by the processor to supply a link to information relevant to the text in which the graphic symbol is contained.

Figure 5:
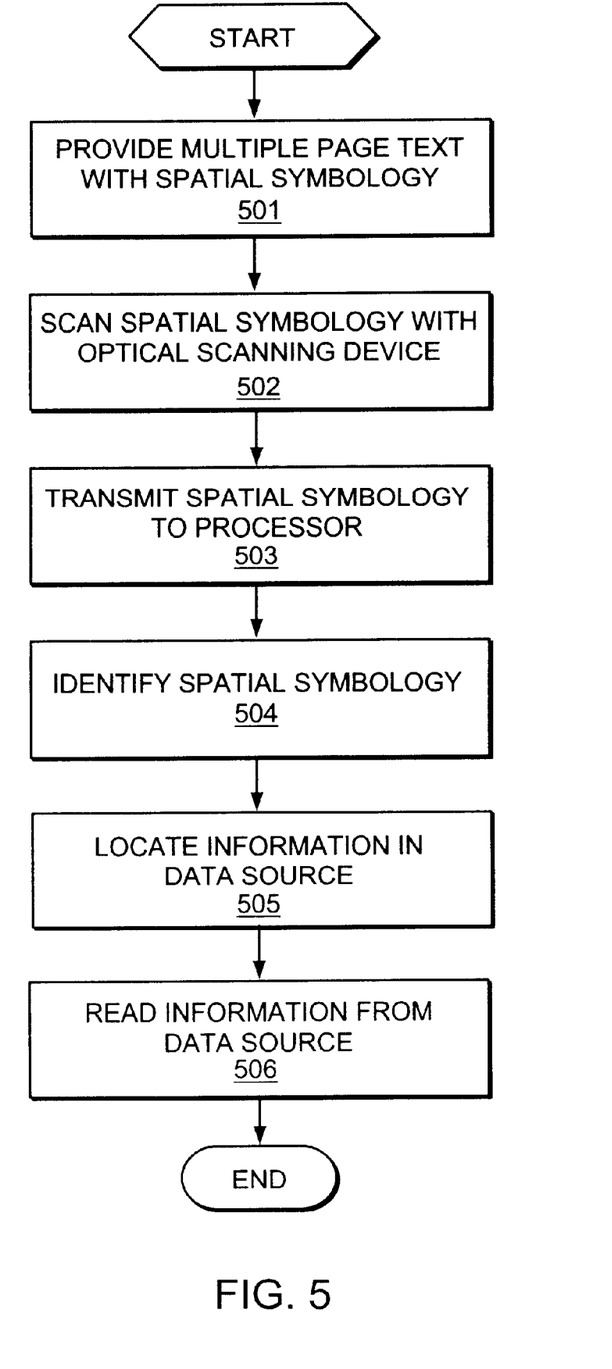
FIG. 5 is a flow chart illustrating a method by which text is selected and information relevant to the text is retrieved according to an aspect of the present invention.

FIG. 5 is a flow chart illustrating a method by which text is selected and and information relevant to the text is retrieved according to an aspect of the present invention. A multiple page text containing spatial symbology is provided 501. The spatial symbology may be located parallel to the text on a page, in a related location to the text such as a footnote, or the spatial symbology may be embedded in graphic symbols within the multiple page text. The spatial symbology corresponding to selected text is scanned 502 with an optical scanning device, and the spatial symbology is transmitted 503 to a processor. The spatial symbology is identified 504 in the processor. Information relevant to the text is located 505 in a data source in communication with the processor, and the processor reads 506 the information from the data source. The processor may read all information contained in the data source or all information contained in a file within the data source. Alternatively, the processor may point to a file, a particular passage of a file, or a particular segment of data in the data source. In further embodiments, the information may be written to a document in a word processor in communication with the processor, viewed on a computer monitor, and printed. The information may also be written to a preexisting file or to a file created by the processor, and oral Annotations may be made to the information via a microphone.

Figure 6:
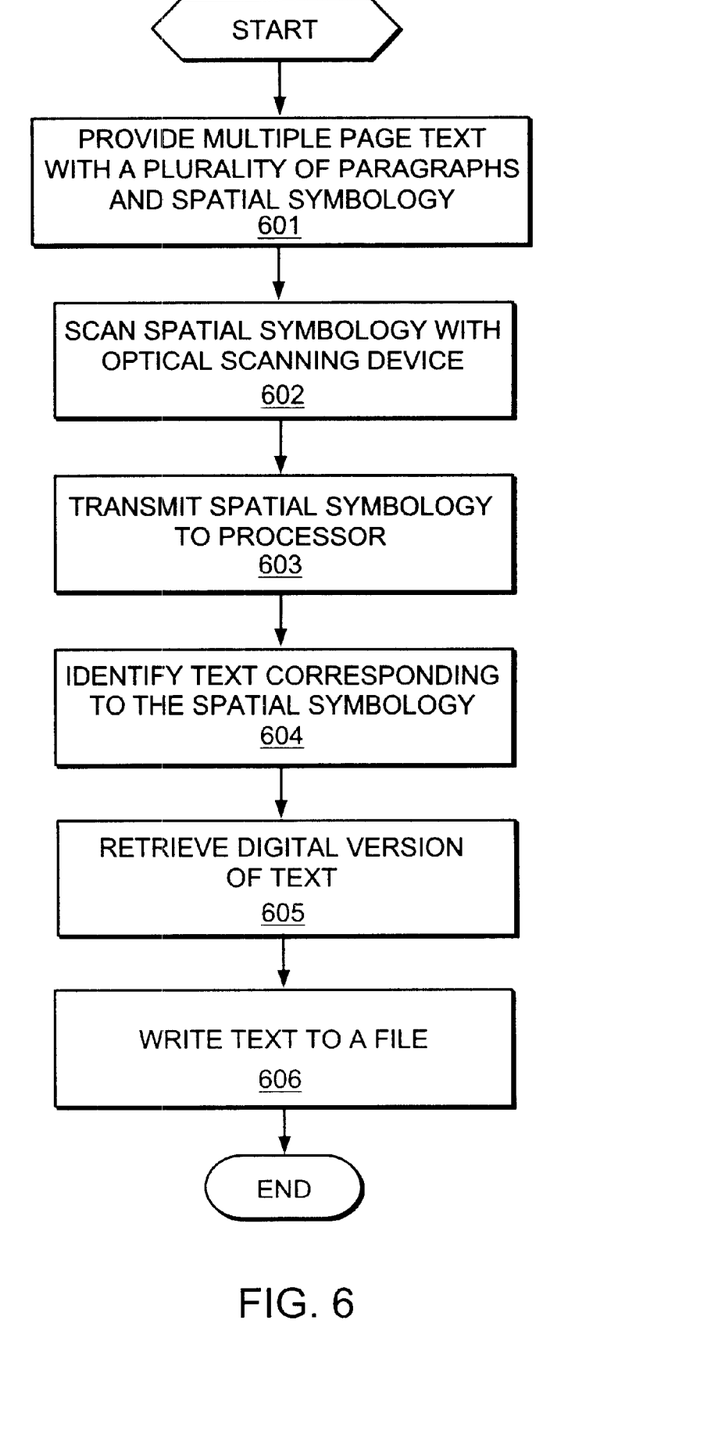
FIG. 6 is a flow chart illustrating a method by which text is selected and a digital version of the text is retrieved according to another aspect of the present invention.

FIG. 6 is a flow chart illustrating a method by which text is selected and a digital version of the text is retrieved according to another aspect of the present invention. A multiple page text containing a plurality of paragraphs, a plurality of graphic symbols, and spatial symbology is provided 601. As was described with respect to FIG. 5, the spatial symbology may be located parallel to the text on a page, or the spatial symbology may be embedded in the graphic symbols. The spatial symbology corresponding to the selected text is scanned 602 with an optical scanning device, and transmitted 603 to a processor. The processor identifies 604 the text corresponding to the spatial symbology, and a digital version of the text is retrieved 605. The selected text may be written 606 to a preexisting file or to a file created by the processor. Here again, the text may be further manipulated in a variety of ways; it may be stored, viewed, printed, annotated, or edited.

The methods and apparatuses of the present invention provide a fast, reliable way to store, record, and reproduce written text. Students, and others relying on prior authority, may simply scan a spatial symbology corresponding to important subject matter and have any part of it stored for later use or reproduced instantaneously in electronic or physical form. While scanning, oral annotations may be recorded through a microphone.

The invention also provides a superior research technique, whereby the spatial symbology supplies an immediate link to other resources, and one document provides access to a wealth of relevant information. In addition, research materials and citations for thesis papers, essays, legal briefs, research papers, and other documents may be compiled quickly and efficiently. Other uses and advantages of the invention will be apparent to those skilled in the art.

It should be understood that various changes and modifications to the preferred embodiment described above will also be apparent to those skilled in the art. For example, the graphic symbols may be letters or symbols associated with any alphabet or even pictures or pictographs. Any of a variety of code reading algorithms may be employed alone or in combination with any of a variety of additional code reading or character recognition algorithms to identify the spatial symbology. These and other modifications can be made without departing from the spirit and scope of the invention and without diminishing its attendant advantages. It is therefore intended that such changes and modifications be covered by the following claims.

What is claimed is:

1. A system for retrieving selected text, the system comprising:
   a multiple page text, the multiple page text including spatial symbology;
   an optical scanning device for detecting the spatial symbology;
   a processor in communication with the optical scanning device, the processor having a memory; and
   a data source in communication with the processor, the data source containing a digital Version of the multiple page text for access by the processor in response to the spatial symbology, wherein the spatial symbology identifies a portion of the digital version of the multiple page text for storage in an electronic file in the memory for subsequent manipulation by a user.

2. A system according to claim 1, wherein the processor is incorporated in the optical scanning device.

3. A system according to claim 1, further comprising a computer monitor in communication with the processor whereby a user may view the information retrieved by the processor.

4. A system according to claim 1, further comprising a printer in communication with the processor.

5. A system according to claim 1, wherein the data source is located at an network address.

6. A system according to claim 1, wherein the spatial symbology is embedded in graphic symbols contained in the text.

7. A system according to claim 1, further comprising a microphone in communication with the processor for oral annotation of the retrieved information.

8. A method for retrieving information related to selected text, the method comprising:
   providing a multiple page hardcopy text, the hardcopy text including spatial symbology;
   scanning the spatial symbology corresponding to selected text with an optical scanning device;
   providing the scanned image of the spatial symbology to a processor, the processor having a memory and being in communication with the optical scanning device;
   identifying the spatial symbology in the processor;
   locating a digital version of the multiple page text in a data source in communication with the processor in response to the spatial symbology; and
   reading the selected text from the digital version of the multiple page text from the data source.

9. A method according to claim 8, further comprising writing the information to a digital file.

10. A method according to claim 8, further comprising writing the information to a document in a word processor in communication with the processor.

11. A method according to claim 8, further comprising creating a file of the information in the processor.

12. A method according to claim 8, further comprising viewing the information on a computer monitor in communication with the processor.

13. A method according to claim 8, further comprising printing the information with a printer in communication with the processor.

14. A system for recording selected passages from written materials, the system comprising:
   a hard copy version of a multiple page text, the text including a plurality of paragraphs and a plurality of graphic symbols;
   spatial symbology corresponding to portions of the text;
   an optical scanning device for reading the spatial symbology;
   a data source having been loaded with an electronic version of the multiple page text independently of any operation of the optical scanning device; and
   a processor in communication with the optical scanning device, the processor having a memory and the processor identifying portions of the multiple page text in the electronic version in response to the spatial symbology.

15. A system according to claim 14, wherein the processor is incorporated in the optical scanning device.

16. A system according to claim 14, further comprising a computer monitor in communication with the processor whereby a user may view and edit the text accessed by the processor.

17. A system according to claim 14, further comprising a printer in communication with the processor.

18. A system according to claim 14, further comprising a microphone in communication with the processor for oral annotation of the selected text.

19. A note taking system comprising:
   a written text recorded along with spatial symbology on a hardcopy version;
   a digital version of the written text;
   an optical scanning device for detecting the spatial symbology;
   a processor in communication with the optical scanning device and with the digital version of the written text;
   a memory in communication with the processor; and
   said note taking system arranged so that scanning spatial symbology associated with a selected portion of the written text identifies the selected text within the digital version so that the processor stores the selected portion in the memory.

20. The system of claim 19 further comprising a microphone in communication with the processor for oral annotation of the selected text.

21. A method for electronically taking notes comprising:
   reviewing a hardcopy human readable text including a plurality of paragraphs of text, the hardcopy including spatial symbology thereon;
   providing access to a digital version of the human readable text;

scanning the spatial symbology corresponding to selected text with an optical scanning device;

providing the scanned image of the spatial symbology to a processor;

identifying the spatial symbology in the processor; and electronically storing the selected text from the digital version of the human readable text to a file.

22. The method of claim 21 further comprising reproducing the selected text on a computer monitor.

23. The method of claim 21 further comprising recording oral annotations to the selected text through a microphone in communication with the processor.

* * * * *